United States Patent [19]

Eichelberger et al.

[11] 4,211,931
[45] Jul. 8, 1980

[54] ELECTRONIC SPEED ERROR SIGNAL PROCESSING CIRCUIT

[75] Inventors: Charles W. Eichelberger, Schenectady; Edward S. Andrejko, Scotia, both of N.Y.

[73] Assignee: General Electric Company, Schenectady, N.Y.

[21] Appl. No.: 864,519

[22] Filed: Dec. 27, 1977

[51] Int. Cl.² .......................................... H02P 9/04
[52] U.S. Cl. .............................. 290/40 A; 318/611; 318/619; 415/30; 415/36
[58] Field of Search ................. 290/40 A; 415/30, 36; 318/611, 621, 622, 624, 629, 619; 307/237, 362; 328/140, 167, 169

[56] References Cited

U.S. PATENT DOCUMENTS

| | | | |
|---|---|---|---|
| 3,227,360 | 12/1975 | MacMullan | 318/619 |
| 3,466,516 | 12/1965 | Goplen et al. | 318/611 |
| 3,524,081 | 8/1970 | Campanella | 328/167 |
| 3,566,241 | 2/1971 | Ross | 318/624 |
| 3,665,345 | 5/1972 | Dolby | 328/167 |
| 3,709,626 | 1/1973 | Eggenberger | 415/17 |
| 3,755,750 | 8/1973 | Heberling | 328/167 |
| 3,817,651 | 6/1974 | Law et al. | 415/36 |
| 3,946,211 | 3/1976 | Jenkins, Jr. | 318/611 |
| 3,986,788 | 10/1976 | Rossi | 415/30 |

Primary Examiner—David Smith, Jr.
Assistant Examiner—M. K. Mutter
Attorney, Agent, or Firm—Geoffrey H. Krauss; James C. Davis; Marvin Snyder

[57] ABSTRACT

An electronic speed error signal processing circuit is provided which attenuates rapid fluctuations ocurring in the speed error signal used to control the fluid inlet valve of a fluid driven prime mover. Such fluctuations contribute greatly to valve wear by causing "valve flutter," the continual rapid opening and closing of the inlet valve as the speed control system of a prime mover instantaneously responds to any small speed error signal fluctuation. By attenuating these rapid fluctuations, valve flutter is reduced.

6 Claims, 4 Drawing Figures

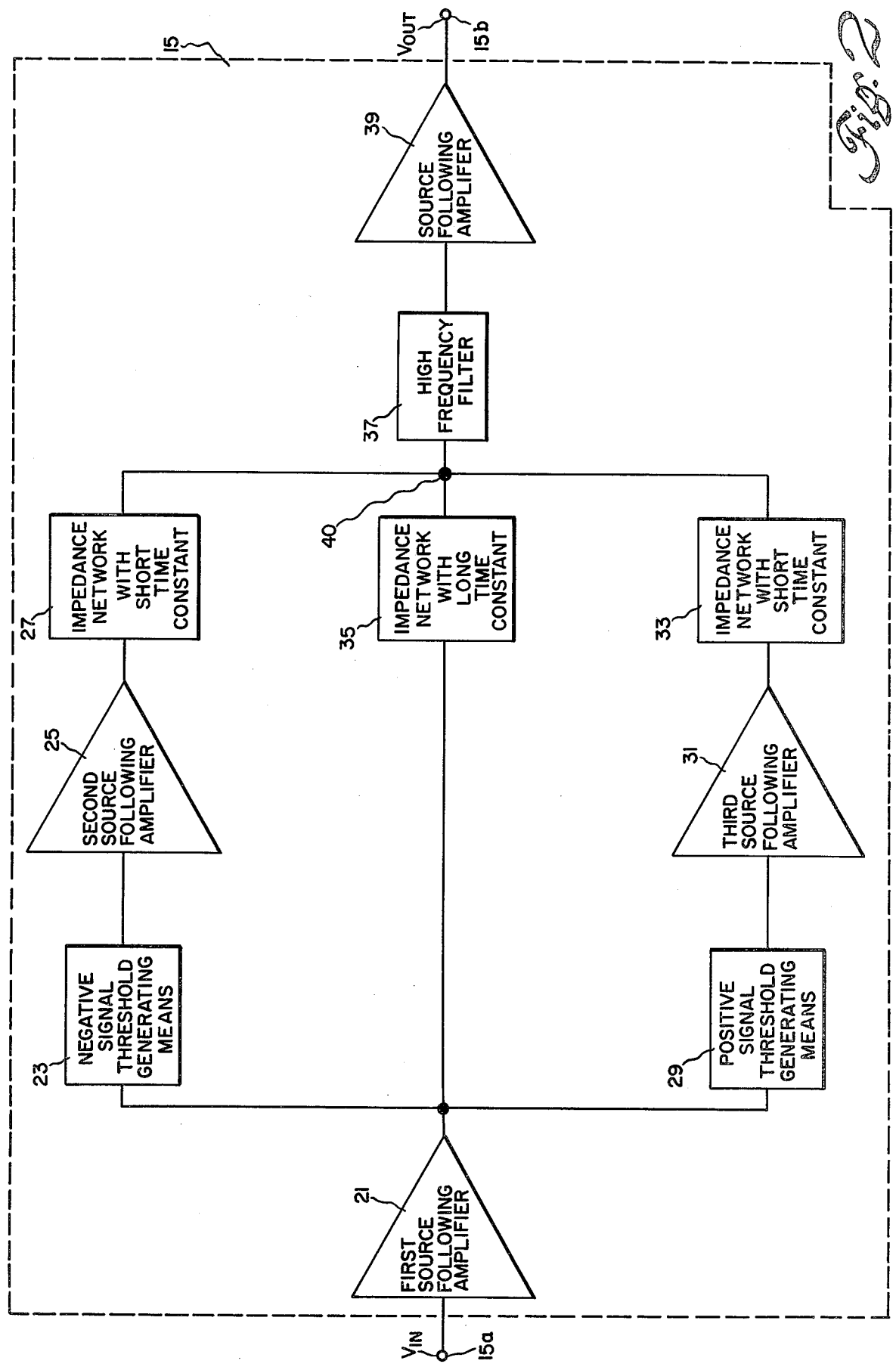

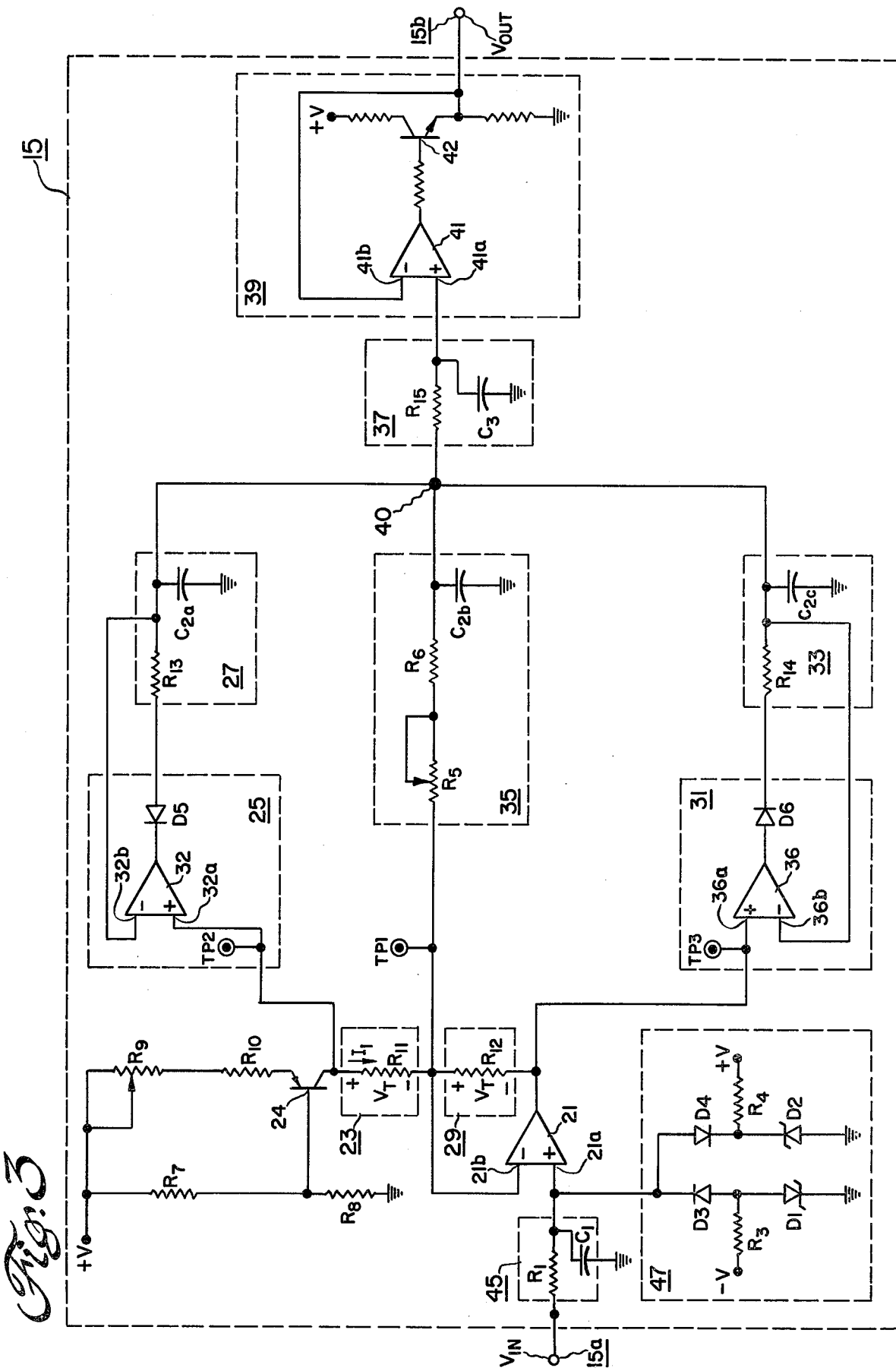

ELECTRONIC SPEED ERROR SIGNAL PROCESSING CIRCUIT

BACKGROUND OF THE INVENTION

This invention relates to speed control systems and more particularly to speed control systems for fluid driven, fluid inlet valve controlled prime movers.

Description of the Prior Art

In fluid driven prime movers such as steam turbines using a fluid inlet valve as a means of controlling shaft speed, the traditional approach has been to locate a rotational velocity sensor at the prime mover output shaft and use the signal generated by the sensor, after being processed by the speed control system, to either further open or further close the fluid inlet valves via servomechanisms, as the changing load situation demands.

Various techniques of turbine valve control for regulating the speed of prime movers are known and one such technique is disclosed in U.S. Pat. No. 3,709,626 issued Jan. 9, 1973 to Eggenberger. In that patent, a digital computer is used to compute valve position set points (reference points). These values are based on a consideration of the operating parameters of the turbine and the operating modes that are desired. An analog speed control loop is used to provide a backup if the digital speed control system fails.

U.S. Pat. No. 3,798,907 issued to Barrett et al. discloses a turbine valve control system using a signal whose frequency varies with the actual speed of the prime mover and comparing this signal to a reference signal whose frequency represents the desired speed, in order to produce an error signal for actuating the turbine control valve.

In U.S. Pat. No. 3,986,788 to Rossi, a digital speed control system for prime movers is disclosed which functions by making a phase comparison between a variable reference digital pulse train input representing desired speed and a digital feedback input representing actual speed. This comparison is made during both steady state operation and when a speed fluctuation occurs. In accordance with this comparison, the speed control system produces an output voltage to control a servo valve.

In the speed control systems of the patents discussed above, the valves attempt to respond instantaneously to any small, rapid changes in prime mover shaft speed with valve motion to correct such speed fluctuations. Unfortunately, as the valves continuously open and close small amounts in accordance with the generally continuous presence of slight fluctuations in speed and load, a condition known as "valve flutter" occurs. This valve flutter effect exhibited by known speed control systems is undesirable primarily because it results in unnecessary valve wear. Applicant has disclosed an electric power generating system which substantially reduces valve flutter. It is apparent to those skilled in the art that improved performance is to be gained by eliminating or substantially reducing valve flutter.

It is an object of this invention to provide an electric power generating system including a speed error signal processing circuit which eliminates valve flutter and the resultant unnecessary valve wear, by attenuating small, rapid fluctuations in speed error signal.

It is another object of this invention to provide an electric power generating system including a speed error signal processing circuit which provides a substantially unattenuated output to error signal fluctuations below a selected frequency and substantial attenuation to error signal fluctuations above this selected frequency and which provides a substantially unattenuated output to error signal fluctuations above a selected threshold level regardless of frequency.

These and other objects of the invention will become apparent to those skilled in the art upon consideration of the description of the invention.

BRIEF SUMMARY OF THE INVENTION

In accordance with one embodiment of the present invention, undesirable valve flutter resulting from small, rapid changes in prime mover shaft speed is overcome by a closed loop speed control system including a signal processor which prevents needless valve motion. Briefly, the signal processor includes electrical circuit means for providing a valve correction signal for shaft speed fluctuations below a selected frequency or shaft speed fluctuation above a selected threshold level regardless of frequency. In a preferred embodiment the signal processor comprises first and second channels for detecting signal fluctuations, representative of shaft speed fluctuations, above selected thresholds (one positive and the other negative) and providing a signal to an impedance network which permits substantially instantaneous response of the valve. The signal processor also includes a third channel which receives an electrical signal representative of all shaft speed fluctuations and provides a signal to another impedance network which enables the valve to respond to shaft speed fluctuations below a selected frequency. The three channels thereby reduce valve flutter by permitting small shaft speed fluctuations to be ineffective to alter the valve position while still providing speed control for major deviations in shaft speed and also achieving a substantially zero speed error.

DESCRIPTION OF THE DRAWINGS

FIG. 2 is a block diagram of one preferred embodiment of the speed error signal processing circuit.

FIG. 3 is a schematic representation of the preferred embodiment of FIG. 2.

DESCRIPTION OF THE PREFERRED EMBODIMENT

Before examining the speed error signal processing circuit itself, it is instructive to consider the nature of the entire closed loop electric power generating system described in accordance with applicant's invention.

Figure 1:
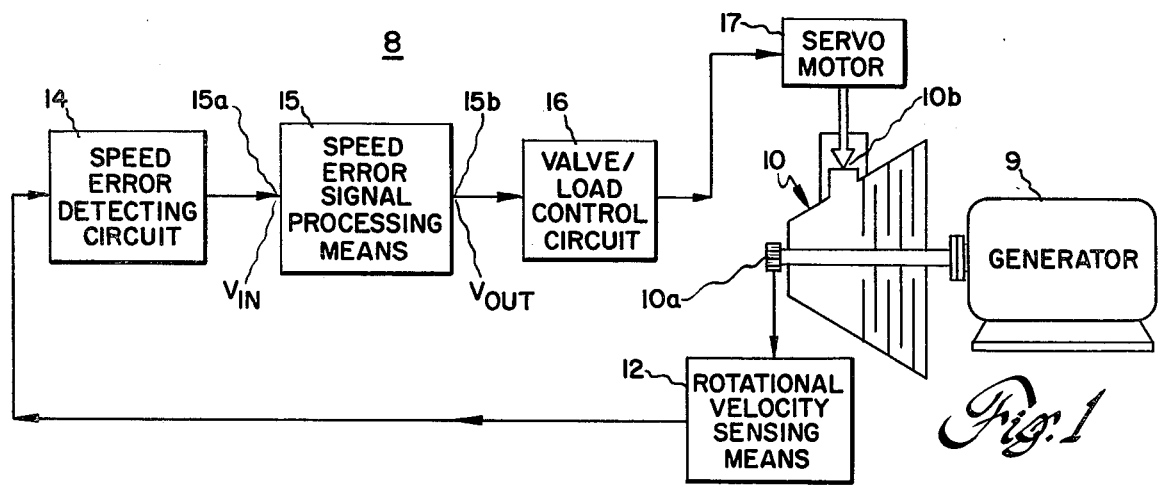
FIG. 1 is a block diagram of the invention showing the insertion of the speed error signal processing circuit into the electric power generating system.

FIG. 1 illustrates, by way of example, an electric power generating system 8 including an electric generator 9 driven by the output shaft 10a of a prime mover 10. A rotational velocity sensor 12, providing an electrical output signal proportional to shaft speed, is used to sense the actual speed of the prime mover output shaft 10a. The output of rotational velocity sensor 12 is then connected to a speed error detecting circuit 14 which produces a DC output voltage, $V_{in}$, having a polarity dependent on whether the shaft speed is faster or slower than the desired operating speed. For example, if prime mover 10 is rotating too fast, a positive DC signal, $V_{in}$, is produced, whose magnitude is directly proportional to the difference in speed between the desired shaft velocity and the actual shaft velocity at which the prime mover output shaft is rotating. Similarly, a negative DC signal, $V_{in}$, is produced by the speed error detecting circuit 14 if the prime mover is rotating slower than the desired operating shaft velocity.

The signal produced by speed error detecting circuit 14 is denoted as the speed error signal which is connected to input 15a of signal processing circuit 15. The signal processing circuit 15 provides the function of substantial attenuation of low level, rapid fluctuations in speed error signals occurring above a selected frequency while providing little attenuation of high level error signal fluctuations of either polarity and slowly fluctuating signals between the input 15a and the output 15b. The processed error signal comprises $V_{out}$, the output of the speed error signal processing circuit 15 which is connected to a valve load control circuit 16 for actuating a servomotor 17 to open and close an inlet valve 10b for controlling load and the speed of prime mover 10 in closed loop fashion.

Having thus considered the overall operation of the closed loop electric power generating system 8, a better understanding of the function performed by the speed error signal processing circuit 15 is provided with reference to FIG. 2; more specifically, FIG. 2 illustrates the input 15a as connected to a first source following (voltage following) amplifier 21 which receives the error signal, $V_{in}$. The output of source following amplifier 21 is connected to a first channel comprising a negative signal threshold generator 23 connected to a source follower amplifier 25 which in turn is connected to a first impedance network 27. The output of the source following amplifier 21 is also connected to a second channel comprising a positive signal threshold generator 29 connected to a source following amplifier 31 which, in turn, is connected to a second impedance network 33. The source following amplifier 21 is also connected to a third channel comprising a third impedance network 35. The first, second and third impedance networks may, for example, be of the resistance-capacitance type. The time constants possessed by the first impedance network 27 and the second impedance network 33 are equal and substantially shorter than the time constant possessed by the third impedance network 35. The outputs of the first, second and third impedance networks respectively form the outputs of the first, second and third channels which are connected together in a common node 40 comprising the input to a high frequency cutoff filter 37 whose output forms the input to another source following amplifier 39. Source following amplifier 39 provides a low impedance output stage for $V_{out}$, the output of the signal processing circuit.

FIG. 3 is a detailed electrical schematic diagram of a preferred processing circuit in accordance with one embodiment of the invention. Amplifier 21 is an operational amplifier having a noninverting input 21a and an inverting input 21b. A suitable amplifier is the L741 integrated circuit available from many semiconductor manufacturers. Amplifier 21 functions as a voltage follower with unity gain. The speed error signal enters the circuit at input 15a and passes through RC filter 45 comprising a series resistor, R1, and a shunt capacitor, C1, connected to ground, to cause undesirable high frequency fluctuations above a selected upper frequency limit, e.g. 80 Hz., to be filtered off to ground.

The output of amplifier 21 produced at TP1 will directly track or follow the input voltage $V_{in}$ because of the voltage follower action of amplifier 21. The output of amplifier 21 is connected at TP1 to resistors R11 and R12 which perform the function of the negative and positive signal threshold generators 23 and 29 respectively, of FIG. 2. Current source 24 and its associated biasing circuitry provide current to R11 and R12, in a manner described below. Current source 24 comprises a transistor whose output current I1, is determined by the value of the various resistors in the associated biasing network comprised of resistors R7, R8, R9 and R10. The amount of current flowing from this source is made variable by the insertion of variable resistor R9 in the emitter line of transistor 24. This current, which flows from the collector of transistor 24, then flows through resistors R11 and R12, each having the same low value resistance, for example, 10 ohms. This results in an equal voltage drop across each resistor R11 and R12. The voltage at TP2 is more positive than the voltage at TP1 by an amount $V_T$ and similarly the voltage at TP3 is more negative than the voltage at TP1 by the same amount. The voltage differential appearing across TP2 and TP3 is centered about the voltage appearing at TP1. The magnitude of the negative and positive signal threshold levels may be determined by measuring the voltage from TP2 to TP1 and from TP3 to TP1 respectively and may be varied by adjusting variable resistor R9, which controls the amount of current flowing through R11 and R12. This, in turn, controls the voltage drops across each resistor R11 and R12. $V_T$, the voltage drop across either R11 or R12, equals one half the voltage drop from TP2 to TP3. $V_T$ represents the voltage which $V_{in}$ must exceed either in a negative or a positive direction in order to trigger operational amplifier 32 or 36, respectively.

Operational amplifiers 32 and 36 have their noninverting inputs 32a and 36a respectively connected to R11 and R12. These amplifiers, preferably of the integrated circuit type such as Model LH740A, an operational amplifier available from the National Semiconductor Company, are connected in source follower configuration, except for the diodes D5 and D6 on their outputs. Diodes D5 and D6 on the outputs of operational amplifiers 32 and 36 respectively, allow only a certain polarity signal to pass from the amplifier output to node 40 where capacitor C2 is then charged. As a practical matter C2 is a single capacitor, but for ease of illustration in FIG. 3, C2 is shown as three capacitors C2a, C2b and C2c in parallel.

The outputs of operational amplifiers 32 and 36 are operatively connected respectively to the impedance network comprising R13 and C2 and the impedance network comprising R14 and C2. The time constants of the R13-C2 and R14-C2 impedance networks are equal and substantially shorter than that of the R5-R6-C2 impedance network which will be discussed later. Thus, the R13-C2 and R14-C2 impedance networks have a fast response to incoming signals from operational amplifiers 32 and 36, respectively, whereas the R5-R6-C2 impedance network will exhibit a substantially slower response.

Operational amplifier 32, diode D5 and resistor R13, connected together in the configuration described above, function as an "ideal diode". The term "ideal diode" as used herein describes a circuit element having a voltage-current response characteristic approximating that of a diode with no DC forward voltage drop and no dynamic impedance. Similarly, operational amplifier 36, diode D6 and resistor R14 function as an "ideal diode".

Low level fluctuations in magnitude of the speed error signal less than $V_T$ do not activate operational amplifiers 32 or 36 and thus pass only through the third channel and are attenuated by the smoothing action of the R5-R6-C2 impedance network comprised by resistors R5, R6 and capacitor C2. For such low level signal fluctuations, the voltage at TP1, which equals the voltage $V_{in}$, charges capacitor C2 (through resistors R5 and R6) to the voltage present at TP1. Thus, the voltage at C2 (node 40) tracks $V_{in}$ through the long time constant of the R5-R6-C2 impedance network.

In more detail, voltage TP1 is applied to the R5-R6-C2 impedance network comprising of a variable electrical resistance, R5, in series connection with resistor R6 to node 40; a filter capacitor C2, is coupled from node 40 to ground. Rapid, low level fluctuations of speed error signal are transmitted along the above described signal path which includes the third channel and are attenuated by the smoothing action of the R5-R6-C2 impedance network. (Speed error signal fluctuations occurring at a high level above the selected threshold generated by R11 and R12 are channeled through amplifier 32 and the R13-C2 impedance network or operational amplifier 36 and the R14-C2 impedance network as will be discussed hereinbelow). The frequency response of the R5-R6-C2 impedance network to rapid, low level error signal fluctuations may be adjusted by changing its RC time constant by varying R5. We have found that, by setting R5 to be a short circuit, an RC time constant of about 0.03 seconds is used to cause attenuation of signal fluctuation down to a frequency of 5.3 Hertz. R5 is set at the full resistance value to produce an RC time constant of about 1.53 seconds to attenuate signal fluctuations down to about 0.1 Hz. If the low level error signal fluctuations occur more slowly than the value of cutoff frequency selected (for a particular prime mover and usage thereof) by varying R5, then the R5-R6-C2 impedance network will track such slow fluctuations without attenuation. Thus, resistor R5 varies the cutoff frequency of the R5-R6-C2 impedance network and acts as a frequency response adjustment.

To examine the operation of the two sections of the preferred signal processing circuit 15 formed by the first channel and the second channel, specifically with regard to the action of operational amplifiers 32 and 36 it is helpful to assume that steady state has been achieved and then follow $V_{in}$ fluctuations (error signal fluctuations) of magnitude large enough to fall above the threshold level $V_T$ as they pass through amplifiers 32 and 36 and their associated circuits.

Figure 4:
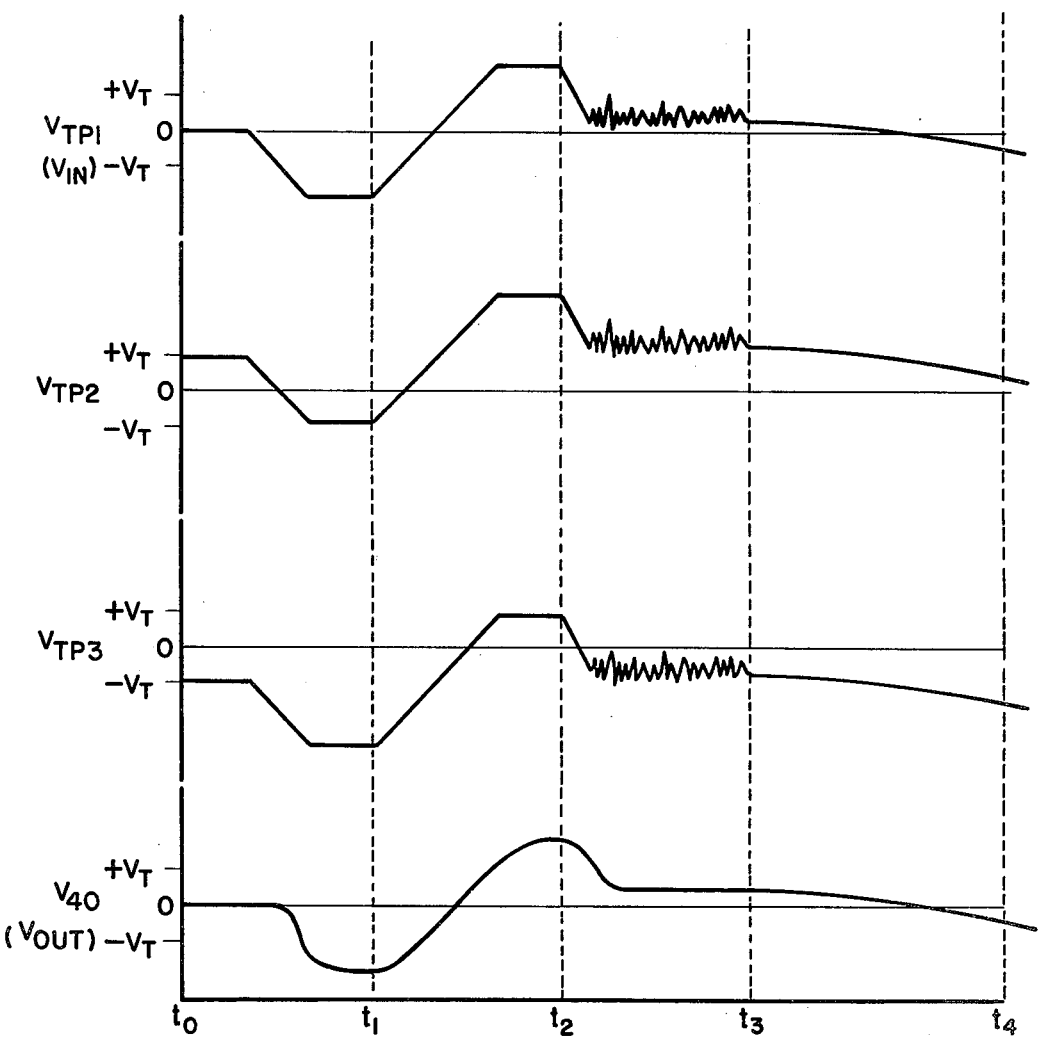
FIG. 4 is a signal waveform diagram illustrating various input waveforms before, during and after they pass through the signal processing circuits of FIG. 3.

FIG. 4 depicts the response of the signal processing circuit to four typical $V_{in}$ input waveforms which the circuit may encounter during its operation. Voltage is plotted versus time.

Assume that a large negative fluctuation occurs in $V_{in}$. FIG. 4 shows the response of the signal processing circuit to such a fluctuation between time T0 and T1. The voltage at TP1 ($V_{TP1}$) will follow the large negative fluctuation while the voltages at TP2 ($V_{TP2}$) and TP3 ($V_{TP3}$) also follow the voltage at TP1 with the appropriate offsets in voltage caused by the action of $V_T$, the threshold voltage which must be overcome.

Referring again to FIG. 3, because of the placement and polarity of diode D5 on the output of operational amplifier 32, this amplifier will only pass negative fluctuations. When the negative voltage fluctuation reaches TP1, the voltage at node 40 does not change instantaneously, because of the RC time constant associated with the R5-R6-C2 impedance network. The voltage at 32b, the inverting input of operational amplifier 32 likewise does not change instantaneously because it is connected to node 40. Therefore, the voltage at 32 is more positive than the voltage on the positive input, TP2, and the output of operational amplifier 32 produces a negative signal which passes through a low value resistance of approximately 10 ohms, R13 through the forward biased diode D5 and to node 40 and C2 connected thereto. The voltage at node 40 thus changes in accordance with the short time constant of the impedance network formed by R13 and C2.

It should be noted again that because of the action of the negative signal threshold generating action of R11, only negative signal fluctuations greater than a certain magnitude of voltage activate operational amplifier 32. Under steady state conditions, the voltage at TP2 is more positive than the voltage at node 40 by the amount of voltage drop across resistor R11, $V_T$/ Before amplifier 32 becomes active, the negative fluctuations of $V_{in}$ must be of sufficient magnitude to overcome this reverse voltage (threshold voltage $V_T$). Negative input signal fluctuations lower than this magnitude do not overcome the reverse voltage of $V_T$ and thus do not activate operational amplifier 32. Therefore, threshold in the negative direction is supplied. Since the amount of the voltage drop across R11 and R12 to be overcome (by $V_{in}$) is variable by adjusting the variable resistor R9 to change the amount of current flow therethrough, the range of $V_{in}$ magnitudes over which operational amplifiers 32 and 36 do not respond is likewise variable. When a fluctuation of input signal, $V_{in}$ is of insufficient magnitude to overcome the thresholds (denoted as $-V_T$ and $+V_T$) imposed by R11 and R12 and in turn activate either operational amplifier 32 or 36, then the signal passes through the only remaining signal path, that is, through the third channel including the R5-R6-C2 impedance network with a long time constant. FIG. 4 shows the response of the signal processing circuits to such a low level $V_{in}$ fluctuation. The graph of $V_{40}$ and $V_{out}$ shows the smoothing action of the R5-R6-C2 impedance network on rapid, low magnitude fluctuations of $V_{in}$ signal over the time interval T2 to T3. $V_{40}$ is the voltage at node 40. $V_{out}$ is the output of signal processing circuit 15 and is identical in voltage magnitude to $V_{40}$. FIG. 4 thus indicates that valve flutter has been substantially attenuated. The graph of $V_{40}$ and $V_{out}$ over the time interval T3 and T4 illustrates the response of signal processing circuits to slow, low magnitude fluctuations ov $V_{in}$ signal in which the fluctuations are of a frequency less than the cutoff frequency of the R5-R6-C2 impedance network. The output $V_{out}$ ($V_{40}$) tracks (or follows) such a waveform.

Referring again to FIG. 3, operational amplifier 36 of the second channel and its associated circuits function in a manner identical to operational amplifier 32 of the first channel discussed above, except amplifier 36 is activated by positive fluctuations of $V_{in}$ (the error signal) which exceed this selected value of threshold now determined by the voltage drop across R12. If a large rapid fluctuation of $V_{in}$ occurs in the positive direction, the voltage at TP1 follows. The voltages at TP2 and TP3 also follow $V_{in}$ fluctuations with the appropriate offsets. (FIG. 4 between time T1 and T2 illustrates such circuit action). As before, the voltage at node 40 will not change instantaneously and thus the noninverting input to the amplifier, 36a will be more positive than the inverting input to the amplifier, 36b. The output of operational amplifier 36 will then change in the positive direction, passing through a low resistance of approximately 10 ohms, R14 forward biasing diode D6 and changing the voltage at node 40 in accordance with the time constant provided by the R14-C2 impedance network. The time constant of the R13-C2 impedance network is equal to the time constant of the R14-C2 impedance network such that the first and second channels have identical circuit response times to positive and negative $V_{in}$ fluctuations of a given magnitude, respectively.

In summary, for $V_{in}$ fluctuations of a magnitude less than the threshold level $V_T$, the response of the preferred processing circuit is governed by the time constant associated with the R5-R6-C2 impedance network. However, for fluctuations of a magnitude greater than $V_T$, response is determined by either the R13-C2 impedance network or the R14-C2 impedance network (depending on whether fluctuation is negative or positive, respectively).

To decrease component count, the capacitive elements of the three impedance networks of the signal processing circuit have been combined in a single capacitor C2 which is shared by the three impedance networks.

The two resistors, R13 and R14 in the RC networks associated with amplifiers 32 and 36 perform another function in addition to determining the time constant of their respective impedance network. In the event that the voltage threshold adjust, R9, is set such that the voltage threshold $V_T$ equals zero, then the voltage at TP2 equals the voltage at TP3 and both amplifiers would overlap in their duties. Without these low value resistors of approximately 10 ohms in the amplifier output lines, the amplifiers would each attempt to produce approximately the same output voltage into the common node 40. Due to normal tolerance variations from chip-to-chip, each amplifier would be trying to produce an output at node 40 slightly offset from the other, in effect resulting in the two amplifiers fighting each other to simultaneously maintain different voltages at the same node, which is impossible. Insertion of resistors R13 and R14 in the output lines of operational amplifiers 32 and 36, respectively, absorbs the offset and prevents the amplifiers from trying to maintain different voltages at node 40.

The output of all three impedance networks are joined at a common node 40 which forms the input to the high frequency cutoff filter 37, formed by a resistor R15 in series with 41a, the positive input of amplifier 41 and a capacitor, C3 connected from 41a to ground. The purpose of the filter is to eliminate unwanted high frequency transients generated when operational amplifiers 32 and 36 quickly switch in and out of saturation in the course of their normal operation. During steady state operation, typically either operational amplifier 32 or 36 is in saturation. When a $V_{in}$ fluctuation occurs, whichever amplifier is in saturation quickly comes out of saturation and an overshoot of the voltage at C2 (node 40) results until the amplifier stabilizes at the new output voltage level. This transient occurs at a relatively high frequency as compared to the normal operative frequencies we are dealing with in the processing circuit. Providing high frequency cutoff filter 37 with a breakpoint of 330 Hz. has been found sufficient to eliminate the transient problem.

The output of the high frequency filter 37 becomes the input of amplifier 41, preferably of the integrated circuit type such as the LH740A described earlier. Amplifier 41 in combination with output transistor 42 connected in emitter follower configuration forms a low impedance output stage. Overall processing circuit output is taken from $V_{out}$ which follows the voltage of the noninverting input of amplifier 41.

FIG. 3 also illustrates the input $V_{in}$ as connected to a pair of signal diodes D3 and D4, respectively coupled to Zener diodes D1 and D2, and also respectively connected to negative and positive power supplies by dropping resistors R3 and R4. This diode-resistor combination is coupled to amplifier input 21a by signal diodes D3 and D4 and provides a signal limiting (clamping) circuit 47. Signal limiting circuit 47 protects amplifier 21 from overloading and saturation which might occur if a failure in a previous circuit causes a high level transient or other noise to be injected into input 15a. Without signal limiting circuit 47, amplifier 21 would take an undesirably long amount of time to recover from such an overdriving signal, whereas with signal limiting circuit 47 in line, an overdriving signal is limited in amplitude such that amplifier 21 is ready to return to normal operation as soon as the abnormal level input signal is removed.

In summary, the applicant has described a signal processing circuit that provides attenuation to the rapid fluctuations in the speed error signal used to control the fluid inlet valve of prime movers. By causing such attenuation, valve flutter, a significant cause of valve wear is substantially reduced.

While a specific embodiment of this invention has been shown and described, it is not intended that the invention be limited to the particular construction shown and described, and it is intended by the appended claims, to cover all modifications which come within the spirit and scope of the claims.

What is claimed is:

1. A signal processor comprising:
   first channel means for providing a substantially unattenuated output signal in response to error signal fluctuations above a selected threshold level of one polarity regardless of frequency, said first channel means including a first signal threshold generating means operatively connected to a first impedance network with a predetermined time constant;
   second channel means for providing a substantially unattenutated output signal in response to error signal fluctuations above a selected threshold level of opposite polarity regardless of frequency, said second channel means including a second signal threshold generating means operatively connected to a second impedance network with a predetermined time constant; and
   third channel means for providing a substantially unattenuated output signal in response to error signal fluctuations below a selected frequency and substantial attenuation to error signal fluctuations above said selected frequency, said third channel means including a third impedance network with a predetermined time constant,
   said first and second signal threshold generating means comprising a current source supplying current to a first resistor in series with a second resistor of equal value, the juncture between said current source and said first resistor maintaining a negative threshold level with respect to the juncture of said first and second resistors, and the remaining terminal of said second resistor maintaining a positive threshold level with respect to the juncture of said first and second resistors; and said first, second and third channel means including respective inputs operatively coupled together to comprise the input to said signal processor and said first, second and third channel means including respective outputs operatively coupled together to comprise the output of said signal processor.

2. The signal processor of claim 1 wherein said first channel means includes first ideal diode means for providing said output signal in response to error signal fluctuations of one polarity and said second channel means includes second ideal diode means for providing said output signal in response to error signal fluctuations of opposite polarity.

3. The signal processor of claim 1 wherein the respective time constants of said first and second impedance networks are substantially equal and substantially less than the time constant of said third impedance network.

4. A closed loop electric power generating system comprising:

an electric power generating means;

a fluid driven, inlet valve controlled prime mover operatively connected by a common shaft to said electric power generating means;

detecting means responsive to the rotational velocity of said shaft for generating a speed error signal proportional in magnitude to the deviation of actual shaft velocity from desired shaft velocity;

a signal processor including:

first channel means coupled to said detecting means for providing a substantially unattenuated output signal in response to error signal fluctuations above a selected threshold level of one polarity regardless of frequency, said first channel means including a first signal threshold generating means operatively coupled to a first impedance network with a predetermined time constant;

second channel means coupled to said detecting means for providing a substantially unattenuated output signal in response to error signal fluctuations above a selected threshold level of opposite polarity regardless of frequency, said second channel means including a second signal threshold generating means operatively coupled to a second impedance network with a predetermined time constant;

third channel means coupled to said detecting means for providing a substantially unattenuated output signal in response to error signal fluctuations below a selected frequency and substantial attenuation to error signal fluctuations above said selected frequency, said third channel means including a third impedance network with a predetermined time constant, said first and second signal threshold generating means comprising a current source supplying current to a first resistor in series with a second resistor of equal value, the juncture between said current source and said first resistor maintaining a negative threshold level with respect to the juncture of said first and second resistors, and the remaining terminal of said second resistor maintaining a positive threshold level with respect to the juncture of said first and second resistors; and valve load control means for opening and closing said inlet valves to control load and shaft velocity in accordance with the output signal from said signal processor.

5. The electric power generating system of claim 4 wherein said first channel means includes first ideal diode means for providing said output signal in response to signals of one polarity and said second channel means includes second ideal diode means for providing said output signal in response to signals of opposite polarity.

6. The electric power generating system of claim 4 wherein the magnitude of the output signal of said current source is variable and controls the threshold levels of said threshold generating means.

* * * * *